UNITED STATES PATENT OFFICE.

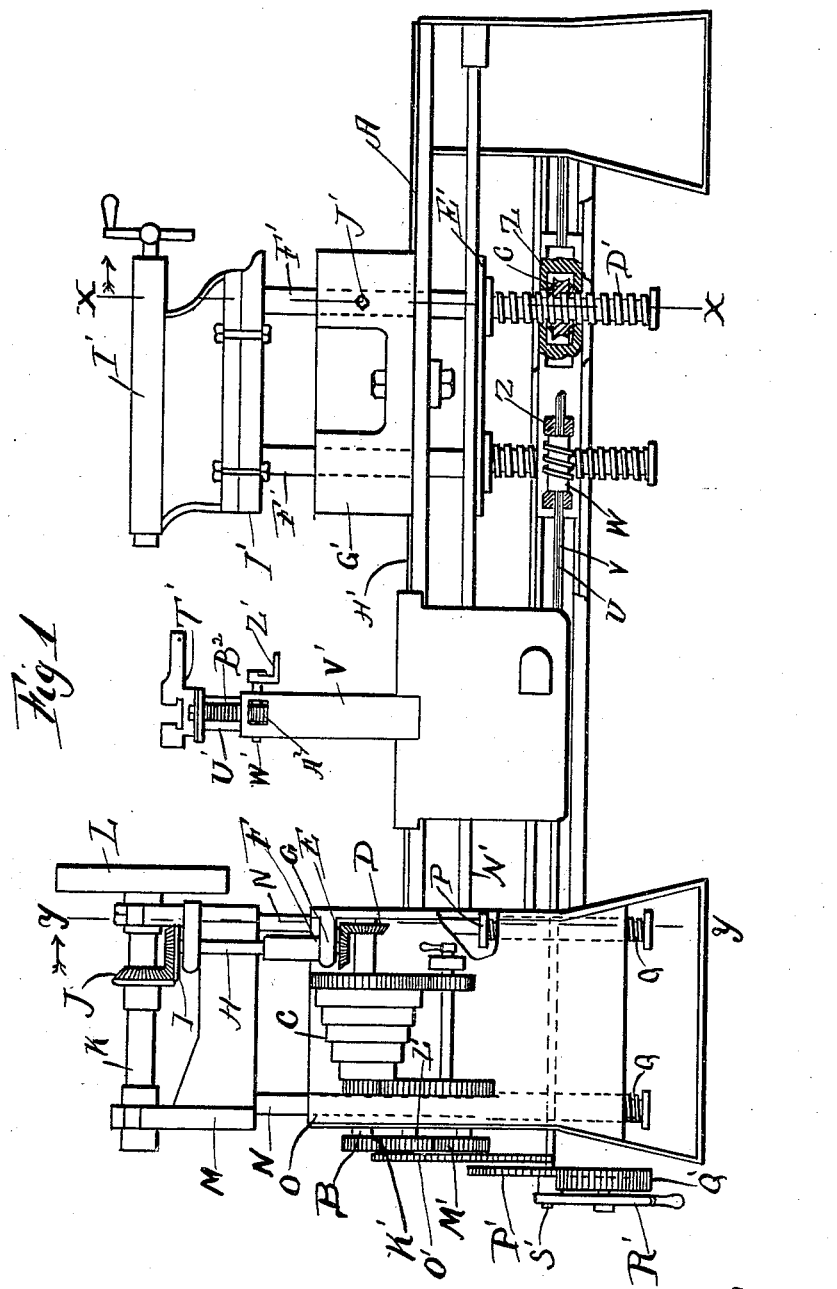

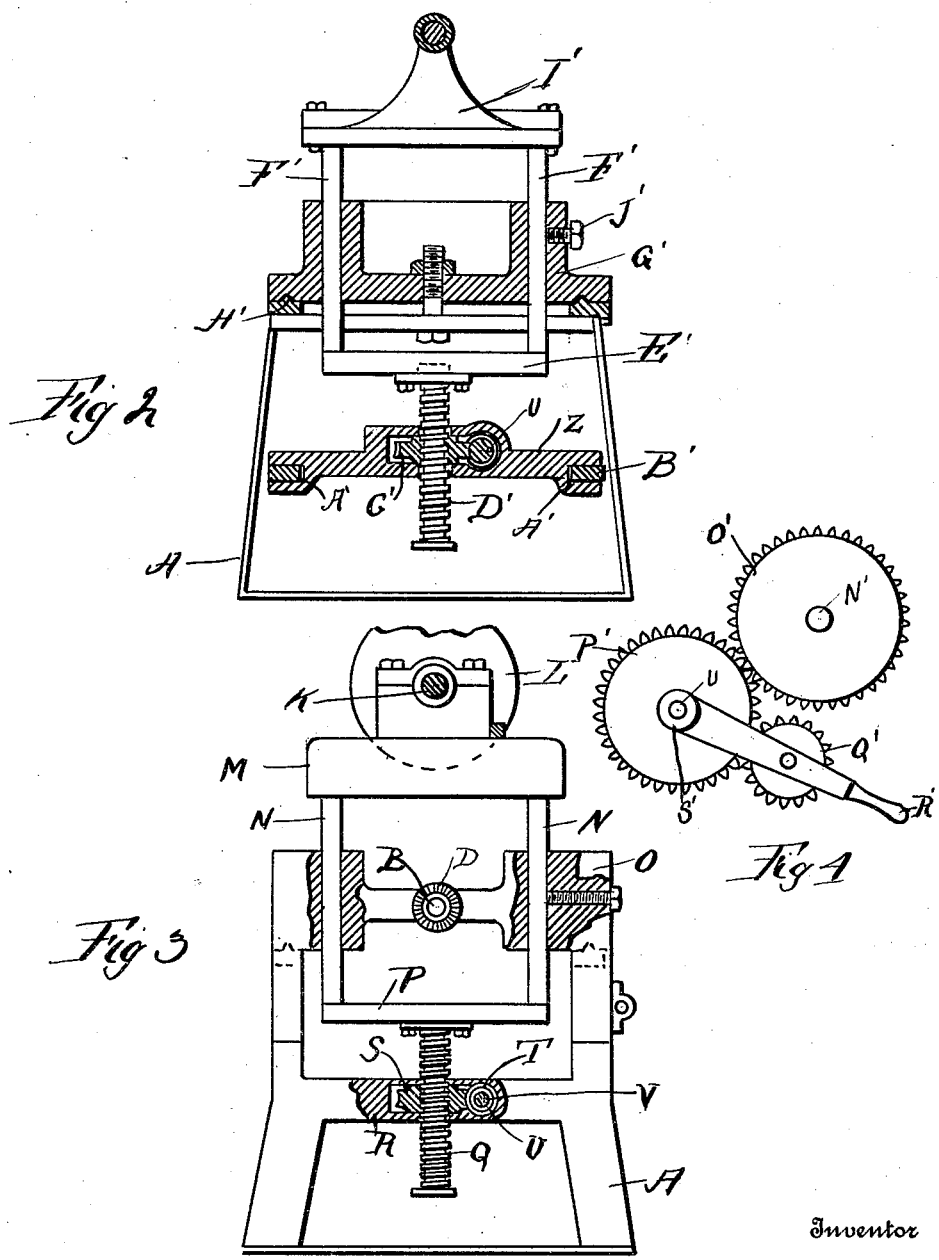

LOIUS BLUGOK, OF PHILADELPHIA, PENNSYLVANIA.

LATHE.

1,005,504. Specification of Letters Patent. Patented Oct. 10, 1911.

Application filed October 29, 1910. Serial No. 589,762.

*To all whom it may concern:*

Be it known that I, LOIUS BLUGOK, a subject of the Emperor of Germany, residing at Philadelphia, in the county of Philadelphia and State of Pennsylvania, have invented a certain new and useful Improvement in Lathes, of which the following is a specification.

My invention relates to a new and useful improvement in lathes, and has for its object to construct a device of this character whereby the head and tail blocks may be raised or lowered by the power utilized to run the lathe.

A further object of the invention is to construct the head block to permit the same to be raised or lowered without the necessity of changing the belts or running gears.

Another object of the invention is to provide means for a micrometer adjustment of the head and tail blocks simultaneously, and this means must be so arranged as to permit a longitudinal movement of the tail block upon the lathe.

A still further object of the invention is to provide means for adjusting the tool rest and the steady rest vertically, and this means for adjusting being independent of the means for adjusting the head and tail blocks.

Figure 1, is a side elevation of a lathe made in accordance with my improvement; portions thereof being broken away to clearly show the construction and the steady rest being removed. Fig. 2, a section at the line X X of Fig. 1, looking in the direction of the arrow. Fig. 3, a section of the line Y Y of Fig. 1, looking in the direction of the arrow. Fig. 4, a diametrical view of the gears used in raising or lowering the head and tail blocks.

In carrying out my invention as here embodied, A represents the frame of the lathe, made any desired size and shape and adapted to carry the ordinary operating gears and shafts as will be more fully explained hereinafter.

B denotes a spindle mounted in the frame, and this is operated by the cone pulley C, and belts as in ordinary practice. Now on this spindle is mounted a beveled gear D, which meshes with the beveled gear E attached to the hollow shaft F and journaled in the bracket G. Telescoping in this hollow shaft F is a shaft H, on the upper end of which is mounted a beveled gear I meshing with the beveled gear J, which is mounted upon the shaft K, carrying the work support L. By producing a telescoping shaft of the parts F and H, it permits the work support L to be operated from the spindle B without changing gears or belts, regardless of the vertical adjustment of the head block M on which the work support is mounted.

The head block M is provided with a number of uprights N arranged in pairs at each side of the head block, and are slidably mounted in the bed O. Each pair of oppositely disposed uprights are joined by a cross-piece P, beneath which is mounted the screw spindle Q passing through a suitable portion of the frame R, in which is mounted the worm gear S; said worm gear meshing with the screw spindle Q and the worm T. Said worm being mounted upon the longitudinal shaft U, said shaft being provided with a keyway V, for a purpose to be hereinafter described. Said longitudinal shaft runs approximately the entire length of the lathe frame, and has splined thereon any desirable number of worms W, being illustrated in this application as using two. Each of these is mounted in a carriage Z, having track grooves A', with which register the tracks B'. These worm pinions each mesh with the worm gear C', mounted upon a screw spindle D' which is swiveled beneath the cross-piece E', attached to the uprights F' which are slidably mounted in the tail bed G' which is slidably mounted upon the tracks H'. On these uprights is mounted the tail block I' which is of the ordinary construction. When the head and tail blocks are adjusted to the position desired they may be held permanently by the set screws J' or their equivalent. As here shown these set screws pass through the beds and are forced against the surface of the uprights.

On the spindle B is mounted a gear K' which meshes with an idler L', the latter meshing with the gear M' mounted upon the shaft N'; this being the ordinary construction for operating a lathe, and from these I apply power to the shaft U for raising and lowering the head and tail blocks; but the manner in which this is accomplished is not important since it may be done in various ways. One of the simplest being shown in the drawing and comprising a gear wheel O', mounted upon the shaft N' with which may be caused to mesh the gear P', or the reversing pinion Q' journaled on the lever R' which is pivoted at S' to the shaft U. The gear wheel P', the pinion Q' and the lever R' being fastened together so that with the movements of the lever these will be caused to operate. Therefore by sliding the lever R' toward the lathe the gear P' will be caused to mesh with the gear O', in this way applying the power from the cone pulley C to the shaft U causing the head and tail blocks to rise to the desired height, and when the blocks are to be lowered the lever is moved along until the gear wheel P' has passed the gear wheel O', and the pinion Q' being of greater width than the combined widths of the gears O' and P'. If said pinion is drawn upward by the lever R' until the latter is brought into mesh with the gear O' then the movement of the shaft U will be reversed which will cause the blocks to be lowered. After the head and tail blocks have been adjusted it is necessary to bring the tool rest and steady rest to a height which will permit them to be used with the head and tail blocks in their adjusted positions. Therefore I provide a means for adjusting the tool rest and steady rest vertically, and have shown one means applied to the tool rest T' and comprises a plunger U', adapted to slide vertically in the casing V' in which is journaled a short shaft W', carrying a crank handle Z', and having mounted thereon a pinion A'' which meshes with a rack B'' upon the side of the plunger U'. The adjustment of the steady rest is accomplished in the same manner and after the head and tail blocks have been adjusted to the positions desired, the tool rest and steady rest may also be adjusted by revolving the crank handle Z' for raising or lowering the rests.

Of course I do not wish to be limited to the exact details of construction here shown, as these may be varied within the limits of the appended claims without departing from the spirit of my invention.

Having thus fully described my invention, what I claim as new and useful, is—

1. In a lathe the combination with a frame of a tail block, uprights slidably mounted on a frame on which the tail block is mounted, screw spindles mounted beneath the uprights, longitudinal tracks, a carriage having track grooves therein, through which the screw spindle passes, a worm gear mounted upon the screw spindle and journaled in the carriage, a longitudinal shaft passing through the carriage adjacent the worm gears, worm spindles, splined to said shaft and meshing with the worm gears, a cone pulley for operating the lathe, and means for transmitting the power from said cone pulley to the longitudinal shaft.

2. In a lathe, the combination with the frame of a head and tail block vertically slidably mounted upon the frame, and means for transmitting power to the head and tail blocks for adjusting the same simultaneously and vertically with relation to the bed or top of the frame for varying the swing of the lathe.

3. In a lathe, a combination with a frame having tracks thereon, of a tail bed slidably mounted upon said tracks, uprights vertically slidably mounted in said tail bed, a tail block mounted upon said uprights, screw spindles mounted beneath said uprights, tracks carried by the frame, a carriage mounted on said tracks through which the screw spindles pass, worm gears mounted upon the screw spindle and journaled in the carriage, other uprights vertically slidably mounted in the frame, a head block mounted on said uprights, screw spindles passing through a portion of the frame and secured to said uprights, worm gears mounted upon said screw spindles and journaled in a portion of the frame, a longitudinal shaft, worms splined upon said shaft and journaled in the carriage meshing with the adjacent worm gears, other worms immovably mounted upon said shaft and meshing with the worm gears mounted upon the screw spindles which operate the head block, a cone pulley for operating the lathe and means for transmitting power from said cone pulley to the longitudinal shaft.

4. In a lathe the combination with a frame, of uprights vertically slidably mounted in the frame, a head block carried by said uprights, a shaft carrying the work support, journaled in the head block, a beveled gear mounted on said shaft, a shaft journaled in the frame, a cone pulley carried by said shaft, a beveled gear mounted upon said shaft, a telescoping shaft, each member of which has a beveled gear mounted thereon, one of said gears meshing with the beveled gear on the cone pulley shaft, the other beveled gear meshing with the gear upon the work support shaft, thus permitting the vertical adjustment of the head block without changing the belts which operate the lathe and run over the cone pulley, screw spindles secured to the uprights passing through a portion of the frame, worm gears mounted upon the screw spindles and journaled in the frame, a longitudinal shaft, worms mounted upon said shaft and meshing with the worm gears, and a train of gears for transmitting power from the cone pulley to the longitudinal shaft.

5. In a lathe the combination with a frame of uprights slidably mounted in the frame, a head block mounted upon said uprights, a screw spindle carried by the uprights journaled in a portion of the frame, worm gears mounted upon said spindles and journaled in the frame, a tail bed longitudinally slidably mounted upon the frame, uprights slidably mounted in said tail bed, a tail block mounted upon said uprights, screw spindles secured to the uprights, a carriage longitudinally slidably mounted upon the frame through which pass the screw spindles, worm gears mounted upon the screw spindles and journaled in the carriage, the carriage and tail bed permitting the longitudinal adjustment of the tail block, a longitudinal shaft, and means for transmitting power from said shaft to the worm gears for simultaneously adjusting the tail and head block vertically in relation to the lathe frame.

6. In a lathe the combination with a frame of a tail bed slidably mounted thereon, uprights vertically slidably mounted in said tail bed, a tail block mounted upon said uprights, screw spindles mounted beneath said uprights, a carriage slidably mounted upon the frame beneath the tail bed through which the screw spindles pass, worm gears mounted upon the screw spindles and journaled in the carriage through uprights vertically slidably mounted in the frame, a head block mounted on said uprights, screw spindles passing through a portion of the frame and secured to said uprights, worm gears mounted upon said screw spindles and journaled in a portion of the frame, a longitudinal shaft, worms splined upon said shaft and journaled in the carriage, meshing with the adjacent worm gears, other worms immovably mounted upon said shaft and meshing with the worm gears mounted upon the screw spindles which operate the head block, a cone pulley for operating the lathe, means for transmitting power from said cone pulley to the longitudinal shaft for revolving the screw spindles, causing a simultaneous adjustment of the head and tail blocks, and a vertical adjustable tool rest mounted upon the frame.

In testimony whereof, I have hereunto affixed my signature in the presence of two subscribing witnesses.

LOIUS BLUGOK.

Witnesses:
MARGIE E. YOST,
CHARLOTTE SAUL.

Copies of this patent may be obtained for five cents each, by addressing the "Commissioner of Patents, Washington, D. C."